United States Patent [19]

Fettweis et al.

[11] Patent Number: 5,341,322

[45] Date of Patent: Aug. 23, 1994

[54] BIT LEVEL PIPELINE DIVIDE CIRCUIT AND METHOD THEREFOR

[75] Inventors: Gerhard P. Fettweis, Berkeley, Calif.; Herbert R. Dawid, Aachen, Fed. Rep. of Germany

[73] Assignee: Teknekron Communications Systems, Inc., Berkeley, Calif.

[21] Appl. No.: 881,336

[22] Filed: May 11, 1992

[51] Int. Cl.$^5$ ............................................. G06F 7/52
[52] U.S. Cl. ............................... 364/764; 364/766
[58] Field of Search .............................. 364/764, 766

[56] References Cited

U.S. PATENT DOCUMENTS

| | | | |
|---|---|---|---|
| 4,872,214 | 10/1989 | Zurawski | 364/766 |
| 4,891,780 | 1/1990 | Miyoshi | 364/766 |

OTHER PUBLICATIONS

T. E. Williams, M. A. Horowitz, "A zero-overhead self-timed 160ns 54-b CMOS divider", IEEE Journal Solid State Circuits; 26(11):1651-61, 1991.

A. Vandemeulebroecke, E. Vanzieleghem, T. Denayer, P. G. A. Jespers, "A new carry-free division algorithm and its application to a single-chip 1024-b RSA processor"; IEEE Journal Solid State Circuits, 25(3); 748-56, 1990.

H. Edamatsu, T. Taniguchi, S. Kuninobu, "A 33 MFLOPS floating point processor using redundant binary representation"; In Proceedings IEEE ISSCC'88, pp. 152-153, 1988.

Primary Examiner—Tan V. Mai
Attorney, Agent, or Firm—Limbach & Limbach

[57] ABSTRACT

A divide circuit having bit level pipeline capability uses an array of bit level carry save adders with each carry save adder having a corresponding absolute value bit level circuit. In one or two's complement notation, the carry save adders subtract the binary values supplied thereto and generates an intermediate binary signal which is supplied to the absolute value circuit. The absolute value circuit determines the absolute value of the binary number supplied thereto. The circuit performs division in accordance with the following algorithm:

$Q_w 1$ $I = W-1$ to $0$ $N = N-D$ $S = \text{Signbit}(N)$ $Q_I = S \text{ (EXOR) } Q_{I+1}$

$N = |N|$

$D = D/2$

END

A recursive divide circuit employing an array of carry save adders and absolute value bit level circuits achieves full pipeline bit level capability.

15 Claims, 7 Drawing Sheets

| | full adder |
| | EXOR |
| | absolute value |
| | MSB absolute value |
| | LSB absolute value |

BIT LEVEL PIPELINE DIVIDE CIRCUIT AND METHOD THEREFOR

TECHNICAL FIELD

The present invention relates to a divide circuit and a method therefor, and more particularly, to a divide circuit capable of performing pipelined division at a bit level.

BACKGROUND OF THE INVENTION

Of the four basic arithmetic operations of addition, subtraction, multiplication and division, circuits have been designed to operate the functions of addition, subtraction and multiplication which can be pipelined at a bit level. To date, however, division operation has been performed by circuits which are either long and time consuming such as by the use of a DSP or required long-latency and complex hardware implementations in VLSI technology. Many circuits have been proposed for implementing division operation in an effective manner. See, for example: O. Spaniol. *Computer Arithmetic, Logic and Design.* Wiley, 1981; O. Spaniol. *Arithmetik in Rechenanlagen,* volume 34 of *Studienbucher Informatik.* Teubner, 1976; V. Carl Hamacher. *Computer Organization.* McGraw-Hill, 1984; K. Hwang. *Computer Arithmetic.* John Wiley & Sons, 1979; and N. R. Scott. *Computer Number Systems and Arithmetic.* Prentice Hall, Englewood Cliffs, 1988.

A fast divide circuit can find use in digital signal processing applications such as speech processing or cryptography. See, for example: T. E. Williams and M. A. Horowitz. A zero-overhead self-timed 160 ns 54-b CMOS divider. IEEE *Journal Solid State Circuits,* 26(11):1651-61, 1991; A. Vandemeulebroecke, E. Vanzieleghem, T. Denayer, and P. G. A. Jespers. A new carry-free division algorithm and its application to a single-chip 1024-b RSA processor. IEEE *Journal Solid State Circuits,* 25(3):748-65, 1990; and H. Edamatsu, T. Taniguchi, and S. Kuninobu. A 33 MFLOPS floating point processor using redundant binary representation. In Proceedings IEEE ISSCC'88, pages 152-153, 1988.

The basic algorithm for dividing a binary numerator value (N), by a denominator value (D) to produce a quotient binary value (Q) is given by the following equation: $N/D = Q = Q_J \ldots Q_0$. Where each of the binary numbers N and D are all assumed to be of the same binary length W and Q has J significant bits. In most operations J=W. There are two basic algorithms for solving the above division problem.

The first is termed restoring algorithm. It is as follows:

```
DO I = W-1 to 0
    N = N-D
    IF (N>0)
        THEN: Q_I = 1
        ELSE: Q_I = 0
            N = N + D
    D = D/2
END
```

In the restoring algorithm, W identical loops are performed recursively with each loop representing the calculation of one bit of the quotient Q. Thus, in this example, Q has W significant bits. Hence, the algorithm in software form consists of a DO loop. In the first step of the algorithm, the denominator D is subtracted from the numerator N and is stored back in the location of N replacing the numerator value. The resultant numerator value N is tested. If N is positive, the quotient bit is set to one. If the result is negative, however, the quotient bit is set to zero and the subtracted amount of D is restored or added back to the location in the numerator N and stored back into the numerator N. This is the concept of "restoring". Thereafter, the denominator value D is divided by two and stored back in the denominator value location. The process continues for the next quotient bit.

In the non-restoring, the method is equivalent. There, the algorithm is as follows:

```
Q_W = 1
DO I = W-1 to 0
    N = N - (2*Q_{I+1} - 1)*D
    IF (N>0)
        THEN: Q_I = 1
        ELSE: Q_I = 0
    D = D/2
END
```

Again, similar to the restoring algorithm, there are W identical stages for the W significant bits of Q. Initially, the quotient bit $Q_w$ is set to one. In the first step of the operation, D is subtracted from N and stored in N. N is now tested. If it is positive, then the quotient bit is set to one. Otherwise, the quotient bit is set to zero. D is then shifted by one bit to derive D/2. The algorithm continues whereby at the next level, N is calculated based in part upon the quotient bit calculated from the prior level. If the quotient bit from the prior level is one, the resulting calculation is:

$$N = N - D$$

On the other hand if the prior quotient bit is zero, the resultant calculation is $$N = N + D.$$

Thus, the quotient bit calculated from a prior stage determines either D is to be added or subtracted from the current value of N.

As can be seen from the foregoing, the non-restoring algorithm differs from the restoring algorithm in that there is no separate step of N=N +D to restore or add the subtracted value of D back to the original N to restore it. Instead, a quotient bit calculated from a prior stage is used to control whether the subsequent operation is an addition or a subtraction operation.

Figure 1:
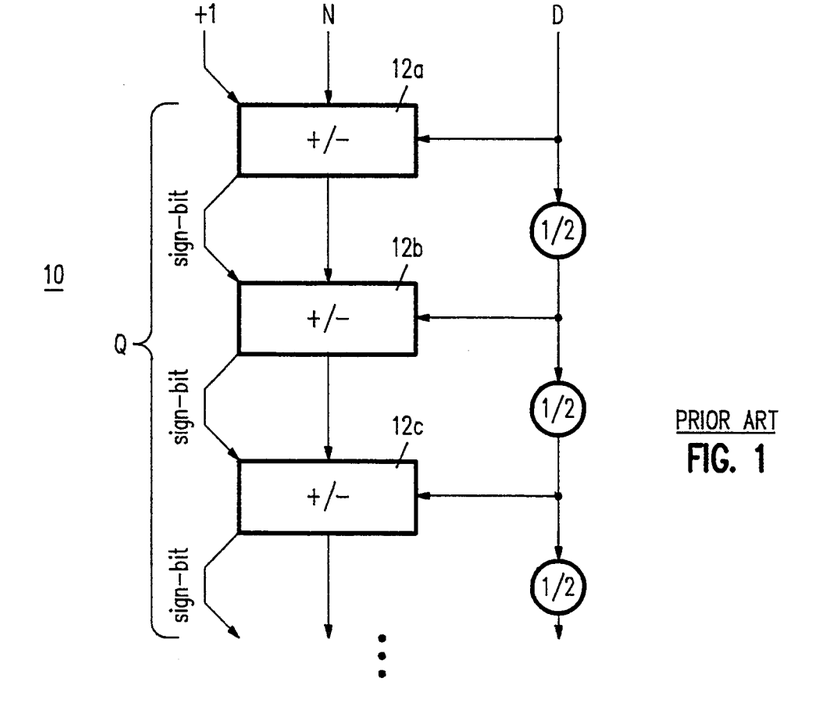
FIG. 1 is a schematic block level diagram of a divide circuit of the prior art.

A basic hardware divide circuit 10 to accomplish the foregoing non-restoring method of binary division is shown FIG. 1 and is known from the prior art. In FIG. 1, the divide circuit 10 comprises a plurality of adder/subtracters 12 (a-c . . . ). The first stage 12a receives the numerator value N and the denominator value D and an initial quotient bit of +1. The result of the operation of the first stage 12a is the term N-D. This value N-D is passed to the second stage 12b. In addition, the denominator value D is shifted by one bit to produce the result D/2. The result of D/2 is also inputted into the second stage 12b. The sign bit of the first stage 12a is used to control the operation of the second stage 12b. The sign bit is used to control the second stage 12b such that it acts either as an adder or as a subtracter. If the sign of the term N-D is positive, then the second stage 12b would perform a subtraction operation. On the other hand, if the sign bit from the operation of the first stage 12a is negative, then the second stage operates as an adder.

The problem with the divide circuit 10 of the prior art is that in order to perform the operation of each stage 12, the operation of a prior stage must be completed in order to obtain the sign bit of the result. The sign bit of the result of a prior stage is then used to decide if the current stage is to be an addition or a subtraction. Since the sign bit result is used, a full carry generation needs to be completed from the LSB (least significant bit) to the MSB (most significant bit). Therefore, pipelining at a bit level is inefficient.

SUMMARY OF THE INVENTION

An apparatus for producing a quotient binary digital signal from a numerator binary digital signal and a denominator binary signal comprises a plurality of substantially similar stages. Each stage comprises a first circuit means for receiving the numerator signal and the denominator signal and for adding the denominator signal to the numerator signal to produce an added signal. The added signal has a plurality of bit signals including a sign bit signal. The numerator signal is representative of a numerator binary value (N). The denominator signal is representative of a denominator binary value (D). The added signal is representative of the numerator binary value subtracting the denominator binary value (N-D). A second circuit means receives the added signal and produces an absolute value signal therefrom. The absolute value signal is representative of the absolute value of the number represented by the added signal. A third circuit means receives the denominator signal and shifts the denominator signal by one bit to produce a shifted signal therefrom- The shifted signal is representative of a shifted number, which is the number supplied thereto divided by two. A fourth circuit means receives the sign bit signal and a quotient bit signal from a prior stage and forms an exclusive OR thereof to produce a quotient bit signal (Q) of the current stage. Finally, the apparatus comprises a means for connecting the plurality of stages by supplying the absolute value signal from one stage as the numerator signal to an immediately adjacent stage and the shifted signal from one stage as the denominator signal to an immediately adjacent stage.

A method for dividing a first binary number by a second binary number by the use of a programmed computer operating a program is also disclosed.

BRIEF DESCRIPTION OF THE DRAWINGS

FIG. 5b is a state diagram showing a possible coding of the finite states of the absolute value bit circuit of FIG. 5a.

DETAILED DESCRIPTION OF THE DRAWINGS

Before discussing the preferred embodiment, it would be useful to discuss the theoretical basis for the divide circuit portion of the present application. In contrast to the non-restoring algorithm of the prior art wherein the operation of each stage cannot commence until the sign bit of a prior stage is determined, the circuit of the present invention performs division in the following steps:

$Q_w = 1$
Do I=W-1 to 0
1) N=N-D
2) $S_I$=Signbit (N)
3) $Q_I = S_I$ (EXOR) $Q_{I+1}$
4) N= |N ↑
5) D=D/2
END Similar to the non-restoring algorithm of the prior art, the division set forth above comprises a plurality of identical stages. There are five steps that are performed in each stage. In the first step, the denominator value D is subtracted from the numerator value N. However, if the denominator value D is represented in complement notation (such as one's or two's complement), then the operation of N+D (where D is in complement notation) is the same as N-D (with D expressed in uncomplement or "normal" notation). In the preferred embodiment described hereinafter, a two's complement value for D is disclosed. Thus, an adder would be used to perform the operation. In the second step, the result of the addition (or subtraction process) is a number having a sign bit. In the third step, the quotient bit of the current stage is determined by exclusively ORing the sign bit of the current stage with the quotient bit from a prior stage. In the fourth step, the absolute value of the added (or subtracted) number (from step 1) is taken. Finally, the denominator value D is then shifted by one bit to produce the result D/2. Since the most time consuming portion of the operation is the addition/subtraction, and since in each stage the determination of whether the operation is subtraction or addition does not depend upon the sign bit from a prior stage, considerable savings in time can be achieved. Further, as will be seen, by relying upon two's complement notation and using only adders, and more particularly as will be shown using a plurality of carry-save bit adders, bit level pipelining can be achieved.

If D were in two's complement, the result N=N−D would also be in two's complement. In that event, the sign bit for the operation in step 2 results in S=1 when N<0 and S=0 when N>. Finally, the operation in the third step can be seen by the following truth table:

| $S_I$ | $Q_{I+1}$ | $Q_I$ |
|---|---|---|
| 0 | 0 | 0 |
| 0 | 1 | 1 |
| 1 | 0 | 1 |
| 1 | 1 | 0 |

The theoretical basis for the above method is as follows. If a prior art non-restore division operation is performed assuming the following calculated terms then the resulting $Q_I$ bits are:

1) $N = N - D > 0$  $Q_{W-1}=1$
2) $N = N - D/2 < 0$  $Q_{W-2}=0$
3) $N = N + D/4 < 0$  $Q_{W-3}=0$
4) $N = N + D/8 > 0$  $Q_{W-4}=1$

The result would be Q = 1 0 0 1
$Q_{W-1}$ $Q_{W-2}$ $Q_{W-3}$ $Q_{W-4}$

Using the present method, the result would be as follows:

1) $N = N - D > 0$   $S=0$
   $N = |N|$
2) $N = N - D/2 < 0$   $S=1$
   $N = |N|$
3) $N = N - D/4 > 0$   $S=0$
   $N = |N|$
4) $N = N - D/8 < 0$   $S=1$
   $N = |N|$ or $S =$   0 1 0 1
$Q =$ 1 1 0 0 1
    $Q_w$ $Q_{w-1}$ $Q_{w-2}$ $Q_{w-3}$ $Q_{w-4}$ with the result being the same as the prior art method.

The foregoing method can be implemented by a computer operating a program. In addition, the foregoing method can be implemented in a circuit.

Figure 2:
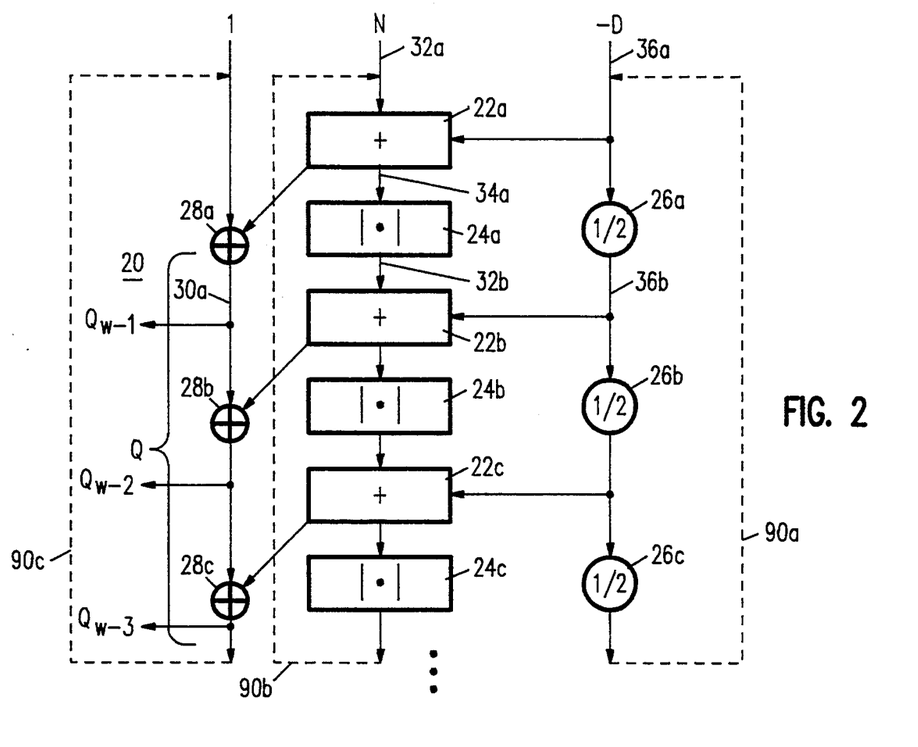
FIG. 2 is a schematic block level diagram of a divide circuit of the present application.

Referring to FIG. 2, there is shown a schematic block level diagram of a divide circuit 20, implementing the foregoing method. The circuit 20 comprises a plurality of substantially identical stages. Each stage comprises an adder 22a, which receives a first binary signal 32a and a second binary signal 36a. The second binary signal 36a represent binary values expressed in complement, such as two's complement of a negative number D. The adder 22a adds the first and second binary signals 32a and 36a and produces a first intermediate binary signal 34a. Since the second binary signal 36a is representative of a binary complement value of minus D, the addition of the first and second binary signals 32a and 36a is the equivalent of the subtraction of the second binary signal 36a from the first binary signal 32a. The first intermediate binary signal 34a also represents a binary value. The first intermediate signal 34a is supplied to an absolute value circuit 24a. The absolute value circuit 24a produces an absolute value of the first intermediate binary signal 34a. The result of the absolute value circuit 24a is a second intermediate binary signal 32b.

The divide circuit 20 also comprises a logic gate 28a which receives the sign bit signal from the first adder 22a and a quotient bit from a prior stage. The gate 28a performs the logical exclusive OR of these two signals and generates a quotient bit signal for use by the subsequent stage.

The divide circuit 20 also comprises a shift circuit 26a. The shift circuit 26a receives the second binary signal 36a and shifts it one bit to produce a shifted signal 36b. The shifted signal 36a n represents the binary value supplied to the shift circuit 26a divided by 2.

Finally, each of the stages is connected together by supplying the output of each stage of the absolute value circuit 24a as the input to the adder of 22b of an immediate adjacent stage as the first binary signal thereof, and by supplying the shifted signal binary signal 36b as the second binary signal to the adder 22b of an immediate adjacent stage, and by supplying the quotient signal 30a to the immediate adjacent stage. The stages perform the operation recursively on the signals provided. In the event it is desired to produce a quotient signal having W significant bits, the circuit 20 would have W identical stages. Alternatively, fewer number of stages can be used where the output of one stage is supplied in a feedback manner into the input of another stage, as shown by the dotted lines 90(a-c) in FIG. 2.

Figure 3A:
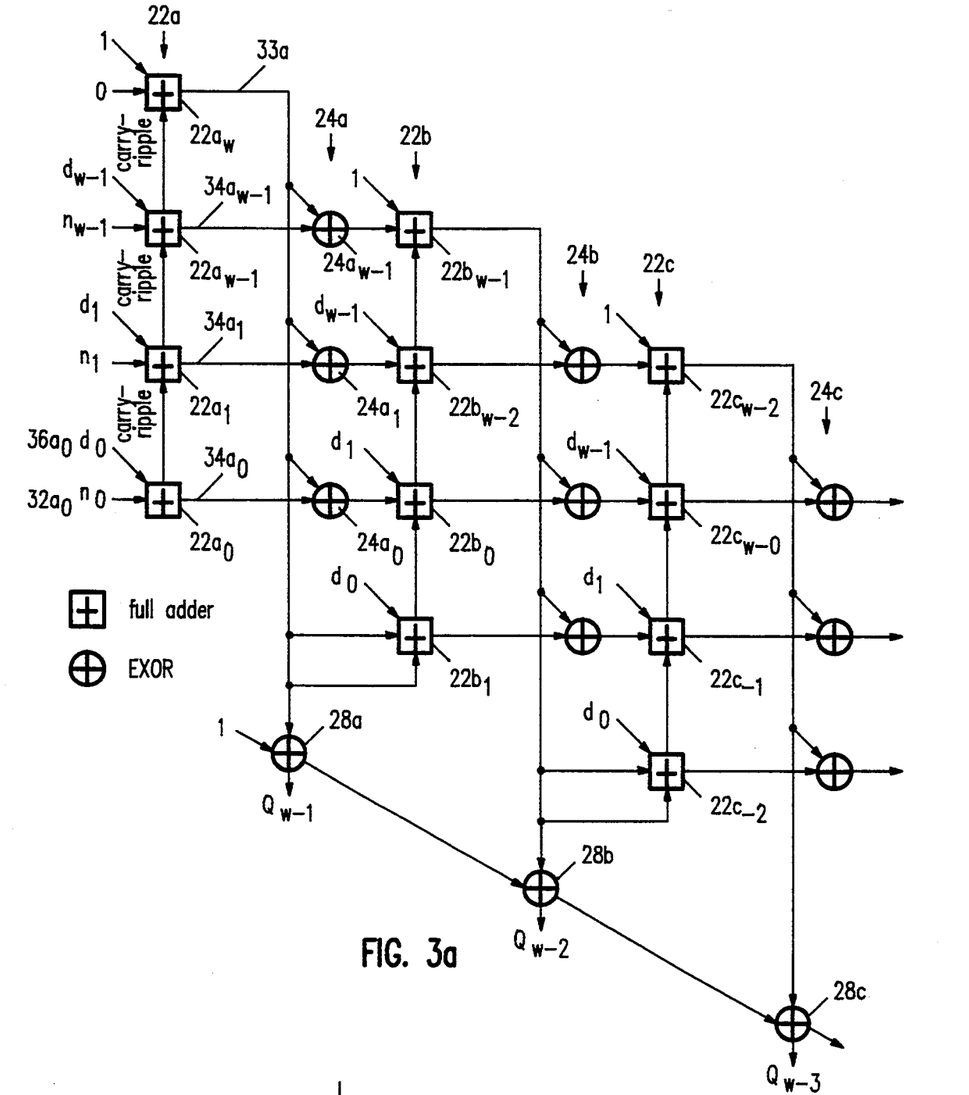
FIG. 3a is a detailed block level diagram of one embodiment of the circuit shown in FIG. 2, wherein each adder comprises a plurality of carry ripple bit adders and wherein the adders operate on a 2's complement representation of a binary number.

Referring to FIG. 3a, there is shown a detailed schematic block diagram of the circuit 20 shown in FIG. 2. In FIG. 3a, the adder 22a is shown as being implemented by a plurality of carry-ripple full bit adders $22a_0-a_{w-1}$, to receive the first and the second binary signals 32a and 36a, with W bits being the maximum number of bits of either the first or the second binary signals 32a or 36a. Each of the carry-ripple full bit adders $22a_I$ receives a bit signal from the first binary signal 32a and the second binary signal 36a at the same corresponding bit position. Thus, for example, the full bit adder $22a_0$ receives a bit signal from the first binary signal 32a and a bit signal from the second binary signal 36a corresponding to the LSB binary position. As previously stated, the first binary signal 32a represents a first binary number N in "normal" form, or $n_{w-1}\ldots n_1$, $n_0$. Thus, the signal presented to the adder 22 can be $0, n_{w-1}, \ldots n_1, n_0$ with a zero in the $N_w$ position. (This would make N a positive 2's complement number.) The second binary signal 36a is the two's complement representation of -D.

Thus, if D is $D_{w-1}, \ldots D_{w-1}, D_0$ then the two's complement of -D is $$1, d_{w-1}, \ldots d_1, d_0$$

This representation creates an extra hypothetical bit in the $d_w$ position. Therefore, an extra hypothetical bit adder $22a_w$ is inserted with $d_w=1$ and $n_w=0$ supplied as inputs thereto.

The result of the addition (or subtraction of the numbers represented by the signals) by the adder $22a_0$ is the first intermediate binary signal $34a_0$ and a carry signal. The carry signal is supplied to the bit adder $22a_1$ which operates upon the immediate adjacent binary position or the next LSB. In this manner, the plurality of bit adders $22a_1$ add the first binary signal $32a$ to the second binary signal $36a$ from LSB to MSB, through the adder $22a_w$, whose output is the sign bit signal $33a$.

The sign bit signal $33a$ is supplied to the first exclusive OR gate $28a$ to produce a first quotient bit $Q_{w-1}$.

The absolute value circuit $24a$ also comprises a plurality of exclusive OR gates $24a_0 \ldots 24a_{w-1}$. Each of the exclusive OR gates $24a_I$ receives an intermediate binary signal $34a_I$ which is the output from a corresponding carry ripple full bit adder $22a_I$, the sign bit signal $33a$, and generates the second intermediate binary signal $32b_I$ therefrom. Because each of the absolute value bits circuits $24a_I$ is an exclusive OR gate, the sign bit $33a$ supplied thereto controls the conversion of the supplied first intermediate bit signal $34a$ to produce the appropriate second intermediate binary signal $32b$.

In the event the sign bit $33a$ is 0, this indicates the result of the addition from the adder $22a$ is positive. In that event, a zero supplied to each of the exclusive OR gates $24a_I$, would cause the output to be the first intermediate binary signal $34a_I$. On the other hand, if the sign bit signal $33a$ is high or is "1" indicating the results of the adder $22a$ is negative, then each of the exclusive OR gates $24a_I$ would receive the first intermediate binary signal $34a_I$ and would produce the inverse of the first intermediate binary signal $34a_I$.

As previously stated, if the second binary signal $36a$ is a complement, such as two's complement, representation of a minus binary value (such as -D) then the output of the first absolute value circuit $24a$ would be the second intermediate binary signal $22b$ which is "complemented". If the result of the adder $22a$ is positive, then the sign bit $33a$ is "0" and two 0's are added to $d_0$ by the adder $22b_I$, yielding $d_0$ with no carry bit signal. The operation of the adders $22b$ of the next stage is as follows:

$$(n_{w-1}-d_{w-1}), \ldots (n_0-d_0), S+S+1, d_{w-1}, \ldots d_1, d_0$$

Since S, the sign bit signal $33a$ is 0, there is no carry from $d_0$ to $d_1$. The alignment of $(n_0-d_0)$ to $d_1$ and the shifting of all the bits by one represents the division of D by 2 to produce D/2. Thus the shifter $26$ is simply the alignment of the bits between every bit position I of $(n-d)_I$ from the adder $22$ and the bit position $(I+1)$ of the binary number $d_{I+1}$.

If the sign bit $33a$ is "1" then the result of the adder $22a$ is negative, and the absolute value thereof must be added by "+1" in the LSB. The operation of the adders $22b$ of the next stage should be:

$$(N_{w-1}-d_{w-1}) \ldots (N_0-d_0+1)+1, d_{w-1}, \ldots d_1, d_0$$

This is the same as $$(n_{w-1}-d_{w-1}) \ldots (n_0-d_0), 1+1+1, d_{w-1}, \ldots d_1, d_0$$

or $$(n_{w-1}-d_{w-1}) \ldots (n_0-d_0), S+S+1, d_{w-1}, \ldots d_1, d_0$$

where $S=1$.

Figure 3B:
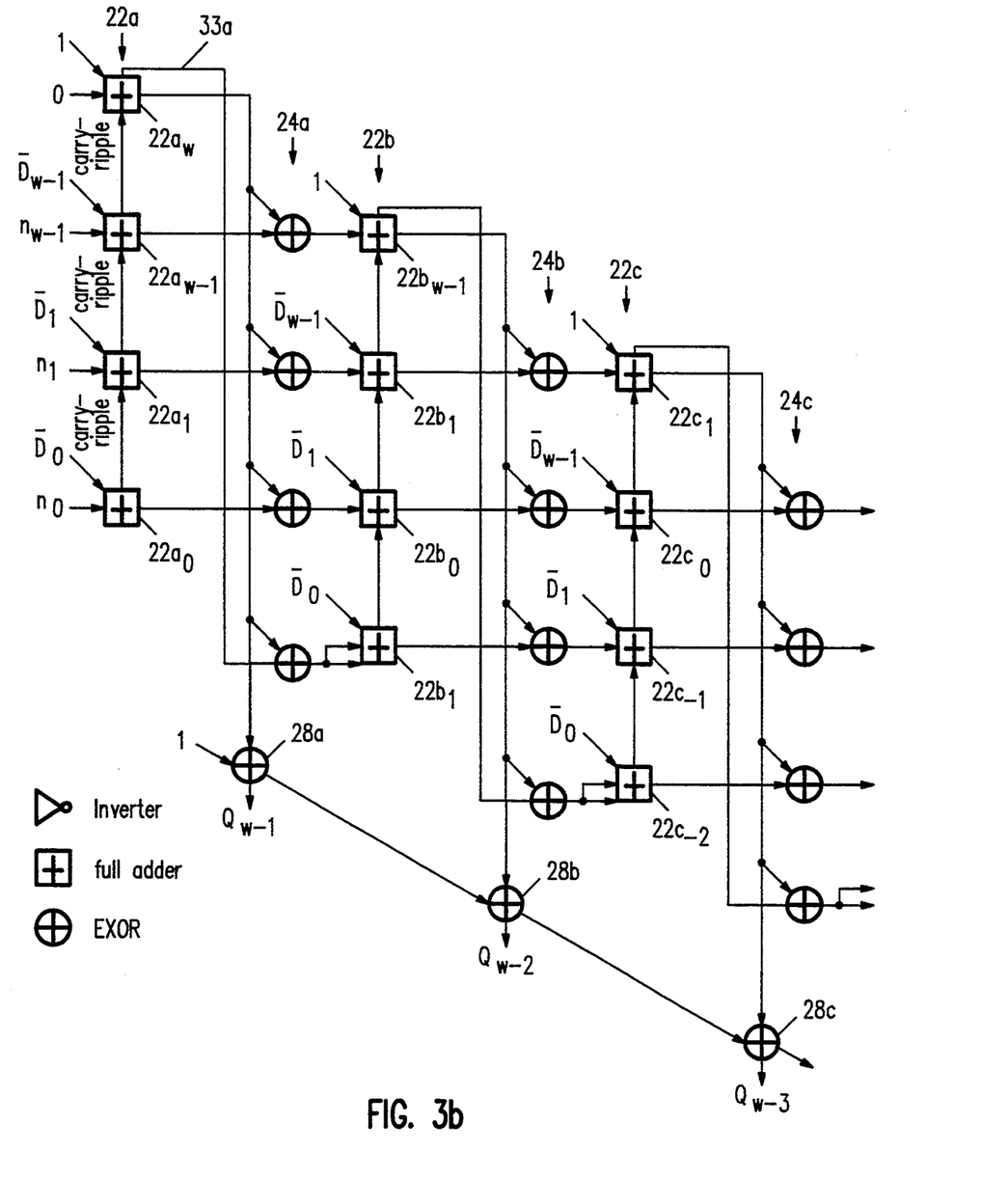
FIG. 3b is a detailed block level diagram of another embodiment of the circuit shown in FIG. 2, wherein each adder comprises a plurality of carry ripple bit adders and wherein the adders operate on a 1's complement representation of a binary number.

The circuit $20$ of FIG. $3a$ shows the addition of N to D, where D is expressed in two's complement notation. As previously discussed, D can also be expressed in one's complement. Referring to FIG. $3b$ there is shown an embodiment of the circuit $20$ wherein the adders $22$ operate on a 1's complement representation of D. In 1's complement representation a 1 must be added to the LSB after the absolute value stage $24$ to "complement" the value, if the sum bit output of the adder $22a_w$ is positive. Thus, similar to the previous discussion, the operation of the adders $22b$ of the next stage should be $$(n_{w-1}-d_{w-1}) \ldots (n_0-d_0 1), 1, d_{w-1}, \ldots d_1, d_0$$

which is the same as $$(n_{w-1}-d_{w-1}) \ldots (n_0-d_0), S+S 1, d_{w-1}, \ldots d_1, d_0$$

where $S=1$.

Although the circuits $20$ shown in FIG. $3a$ or $3b$ show that either of the divide circuit $20$ can be pipelined at a bit level, the use of a plurality of carry-ripple full bit adders $22a$ requires a signal flow from LSB to MSB. However, since each absolute value bit circuit $24a_I$ is an exclusive OR gate, whose function is controlled by the sign bit $33a$, the operation on the first intermediate binary signal $34a$ would proceed from the MSB to the LSB. This would result in the circuit $20$ that runs from the LSB through all bit levels to the MSB and then back down to the LSB for each stage. Since this occurs repeatedly, this would result in a large latency time and to inefficient skewing buffers.

The latency for a circuit $20$ with a plurality of carry ripple full bit adders, operating on binary signals having W bits is W consecutive additions of W bits width, plus W EXOR gates. This would result in a latency of $W^2$ with an array $(W \times W)$ of carry ripple full bit adders and W EXOR gates. Even with faster adders, such as carry-look-ahead, the latency cannot be reduced below $O(W \log W)$, requiring additional logic gates for the carry generation.

Figure 4A:
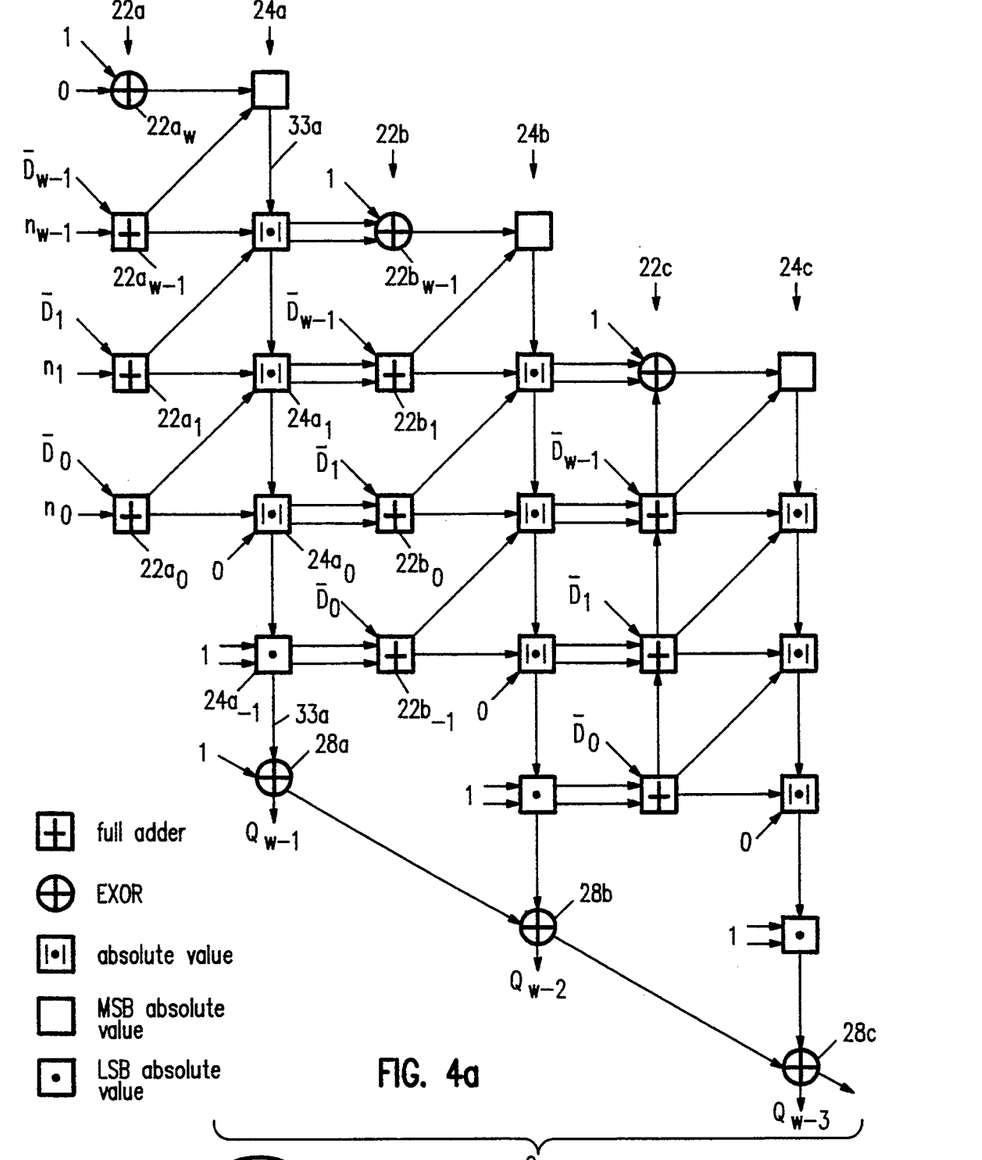
FIG. 4a is a detailed block level diagram of one embodiment of the circuit shown in FIG. 2 wherein each adder comprises a plurality of carry-save bit adders and wherein the adders operate on a 2's complement representation of a binary number.

Referring to FIG. $4a$ there is shown the preferred embodiment of the circuit $20$. In the embodiment shown in FIG. $4a$, each of the adders $22a$ comprises a plurality of carry-save bit adders $22a_{w-1-0}$, with each carry-save bit adder $22a_I$ operating upon a bit signal from the first and second binary signals $32a$ and $36a$ respectively. In response thereto, each of the carry-save adders $22a_I$ generates a first intermediate binary signal $34a_I$ and a carry signal. The first intermediate binary signal $34a_I$ is supplied to a corresponding absolute value bit circuit $24a_I$. The carry signal is supplied to the absolute value bit circuit $24a_{I+1}$ operating on the binary position to which the carry signal would have been supplied for binary addition. Since the carry signal flow goes only one single bit level upwards per addition, the latency as a result of using a plurality of carry-save bit adders $22a_I$ is reduced to that of waiting for the adjacent carry-save bit adder $22a_I$ to perform its operation on the adjacent bit. In this manner, pipeline of the adders $22a$ can proceed from the MSB to the LSB, just like the absolute value circuit $24a$.

Figure 5A:
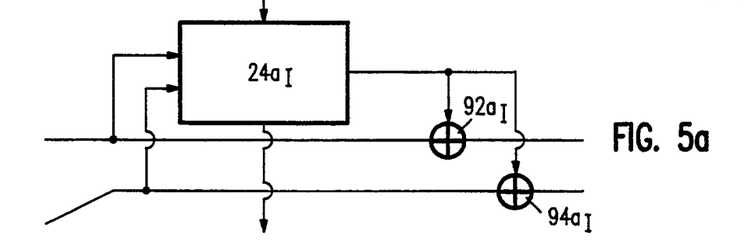
FIG. 5a is a block level diagram of the absolute value bit circuit shown in FIG. 4.

Referring to FIG. 5a there is shown a detailed schematic block level diagram of the absolute value bit circuit $24a$, in the preferred embodiment. As previously discussed, each of the absolute value bit circuit $24a_I$ receives a first intermediate binary signal $34a_I$ from a carry-save bit adder $22a_I$ corresponding to the same bit position as the absolute value bit circuit $24a_I$, and a carry signal from a carry-save bit adder $22a_{I-1}$ immediately adjacent in bit position to the corresponding bit adder. The two input signals are also supplied to two exclusive OR gates 92 and 94 which are controlled by the result of the absolute value bit circuit $24a$ and produce the result of the second intermediate binary signal $32b$ as the output of the absolute value circuit $24a$. In addition, the absolute value circuit $24a$ receives a control signal (which may comprise more than one signal line) to control the operation of the circuit $24a_I$. One of the control signal is the sign bit $33a$.

Figure 5B:
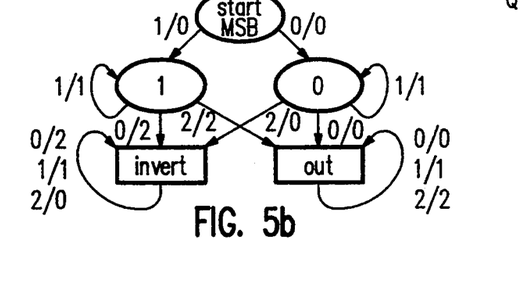

The absolute value bit circuit $24a$ is a finite state machine whose state diagram is shown in FIG. 5b. The control for each of the absolute value bit circuit $24a$ begins at the absolute value bit circuit $24a_{w-1}$ which corresponds to the MSB position. Starting at the MSB position, the finite state shown in FIG. 5b steps through iteratively down to the LSB. Each branch is labeled with the value of the current bit-level input, and the output.

The absolute value bit circuit $24a$ as shown in FIG. 5a and its accompanying finite state shown in FIG. 5b are fully disclosed in G. Fettweis and H. Meyr. High-speed Viterbi processor: A systolic array solution. *IEEE Journal on Sel. Areas in Commun.*, SAC-8 (8):1520–1534, Oct. 1990. In the foregoing article, a carry-save maximization circuit is disclosed. The use of the carry-save maximizing circuit as an absolute value circuit is disclosed in G. Fettweis and H. Meyr. A 100 Mbit/s Viterbi decoder chip: Novel architecture and its realisation. In *Proceedings of the 1990 Int. Conf. on Communication*, Atlanta, Ga. 1990. Logic for this absolute value bit circuit $24a$ can be derived from using the finite states defined in and shown in FIG. 5b and by logic synthesizing tools, such as those available from Synopsys Company.

In the aforementioned references, the plurality of carry-save bit adders and carry-save maximizing bit circuits were used for processing a Viterbi algorithm which is used in maximum likelihood sequence estimation.

Figure 4B:
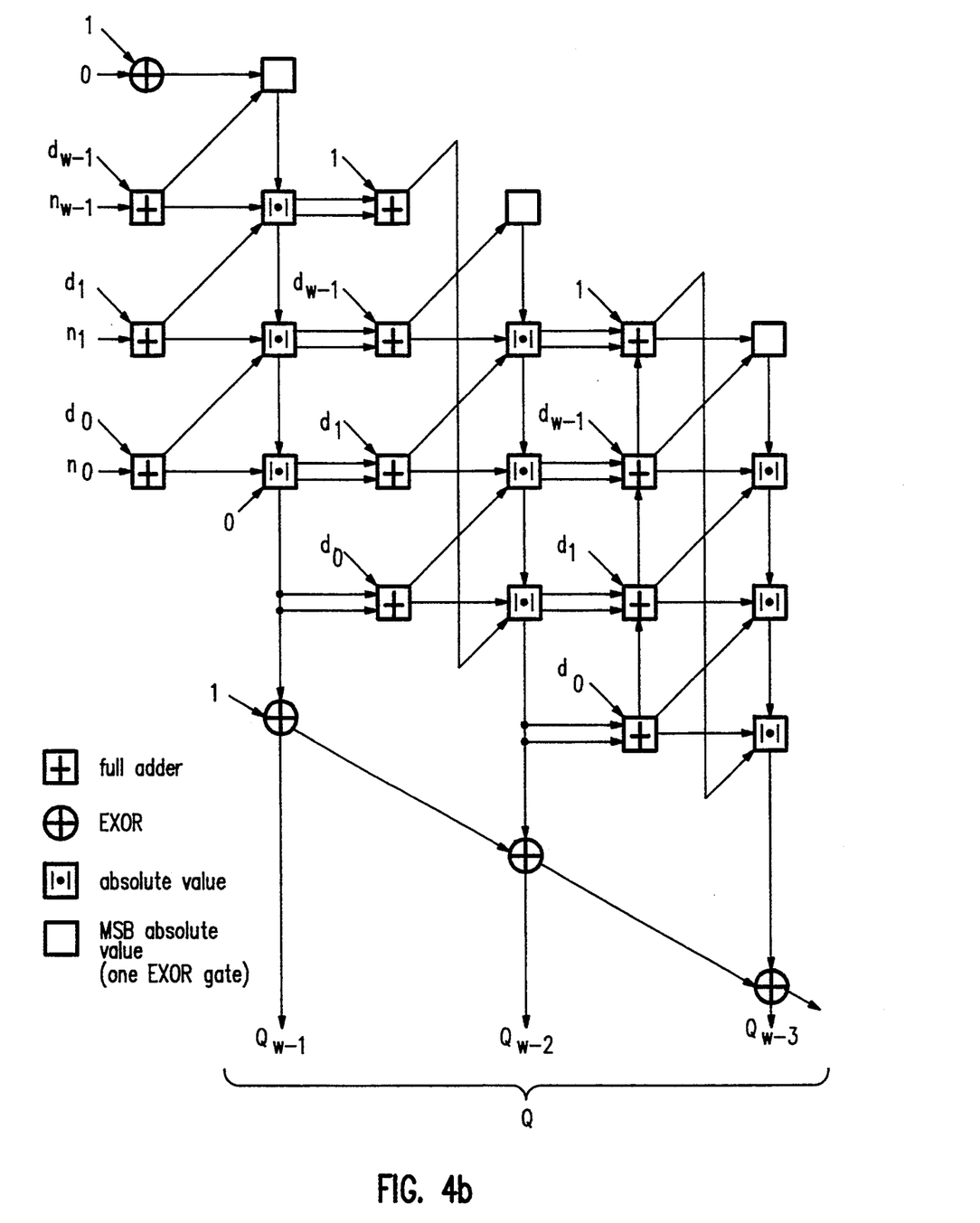
FIG. 4b is a detailed block level diagram of another embodiment of the circuit shown in FIG. 2, wherein each adder comprises a plurality of carry ripple bit adders and wherein the adders operate on a 1's complement representation of a binary number.

Similar to the discussion for the circuit 20 employing a plurality of carry ripple full bit adders 24, the output of the adder $22a$ must be uncomplemented. The uncomplementation occurs, if the sign bit signal $33a=1$, by adding the following bit values to the $(n_{w-1}-d_{w-1}), \ldots (n_1-d_1), (n_0-d_0), 1 \cdot 2^0, 1 \cdot 2^{-1}, 2 \cdot 2^{-2}$ or $(n_{w-1}-d_{w-1}), \ldots (n_1-d_1), (n_0-d_0), 1+\frac{1}{2}+\frac{1}{2}$ or $(n_{w-1}-d_{w-1}), \ldots (n_1-d_1), (n_0-d_0), 2$ or $(n_{w-1}-d_{w-1}), \ldots (n_1-d_1), (n_0-d_0+1)$ Similar to the discussion with regard to the embodiment shown in FIG. 3b, another embodiment of the circuit 20 is where D is expressed in one's complement notation. Operating on a 1's complement representation is shown and described in FIG. 4b.

Figure 4C:
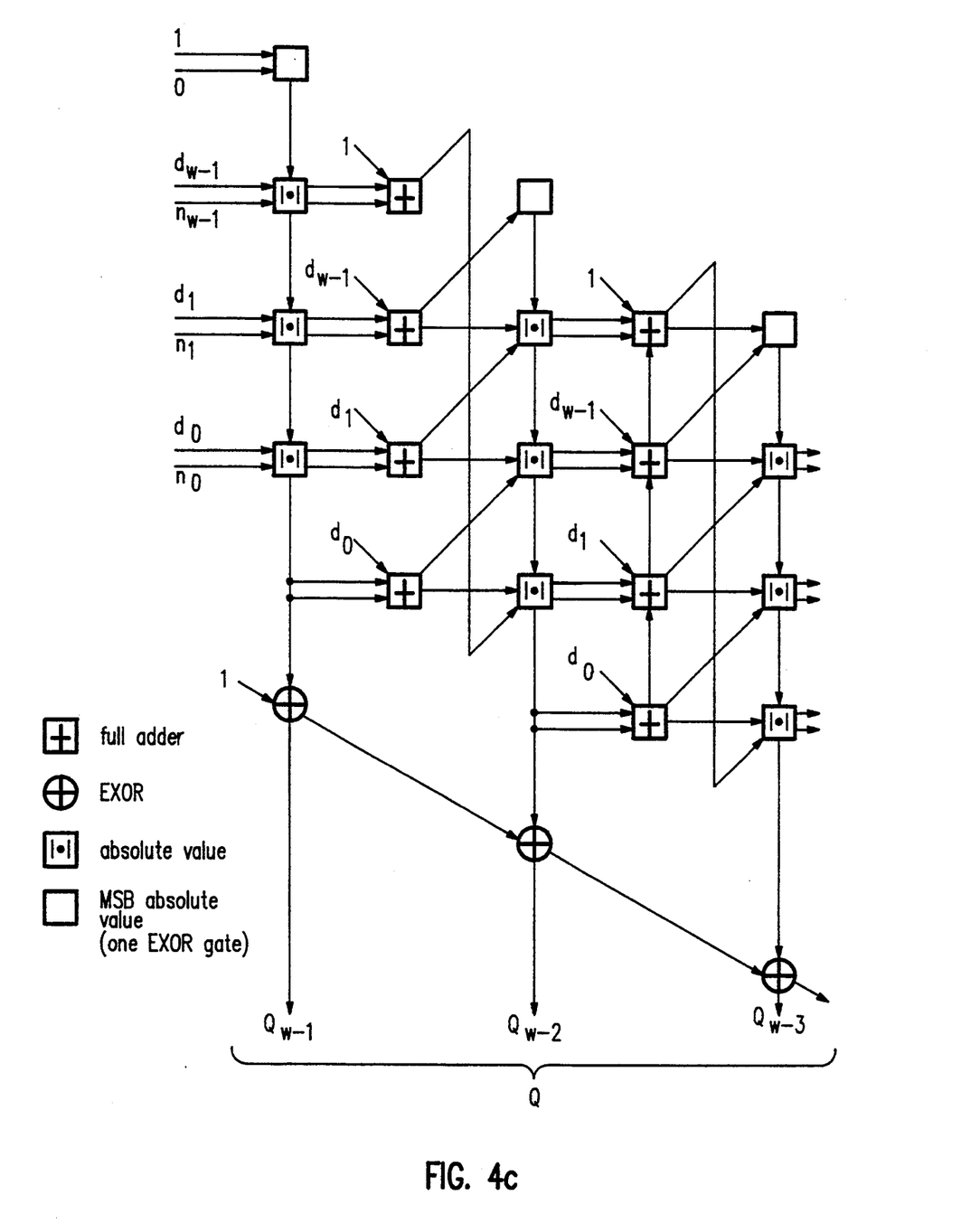
FIG. 4c is a detailed block level diagram of yet another embodiment of the circuit shown in FIG. 2, wherein each adder comprises a plurality of carry ripple bit adders and wherein the adders operate on a 1's complement representation of a binary number.

FIG. 4c shows another embodiment of the circuit 20 with a plurality of carry-save bit adders 22 operating on a 1's complement representation, with the first stage adders 22 simplified.

Each of the carry save bit adders $22b_I$ is shown in FIG. 4 as receiving two bit signals from the output of the corresponding absolute value bit circuit $24a_I$, and one bit signal from the binary signal $36b_x$ (where X depends on the stage or number of shifts of D), and generating an output bit signal and a carry bit signal in response thereto. Thus, there are three inputs with two outputs. Carry-save bit adders are well known in the art. However, prior art carry-save bit adders receive two sets of two binary input signals each, and generate one output and one carry bit signals therefrom. Thus, the prior art carry-save bit adder receives four inputs and generates two outputs. Thus, the carry save bit adders 22 used in the circuit 20 is a simplified version of the prior art device, and can simply be the prior art device with one input disabled. This, of course, is not an optimized carry-save adder 22.

Figure 6:
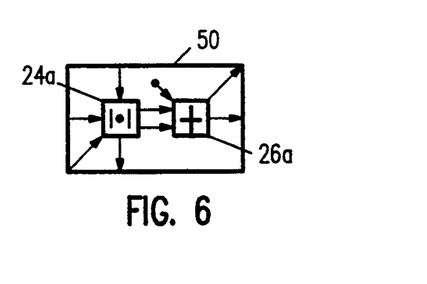
FIG. 6 is a block level diagram showing a combination of an absolute value bit circuit and a corresponding carry-save bit adder circuit, together as one basic cell.

Referring to FIG. 6 there is shown a basic cell 50 comprising of an absolute value bit circuit $24a$ and its associated carry-save bit adder $26a$ showing the inputs thereto and the outputs therefrom. With these basic cells 50, a divide circuit 20 comprising of a plurality of these basic cells 50 which can be pipelined at a bit level can be constructed.

Figure 7:
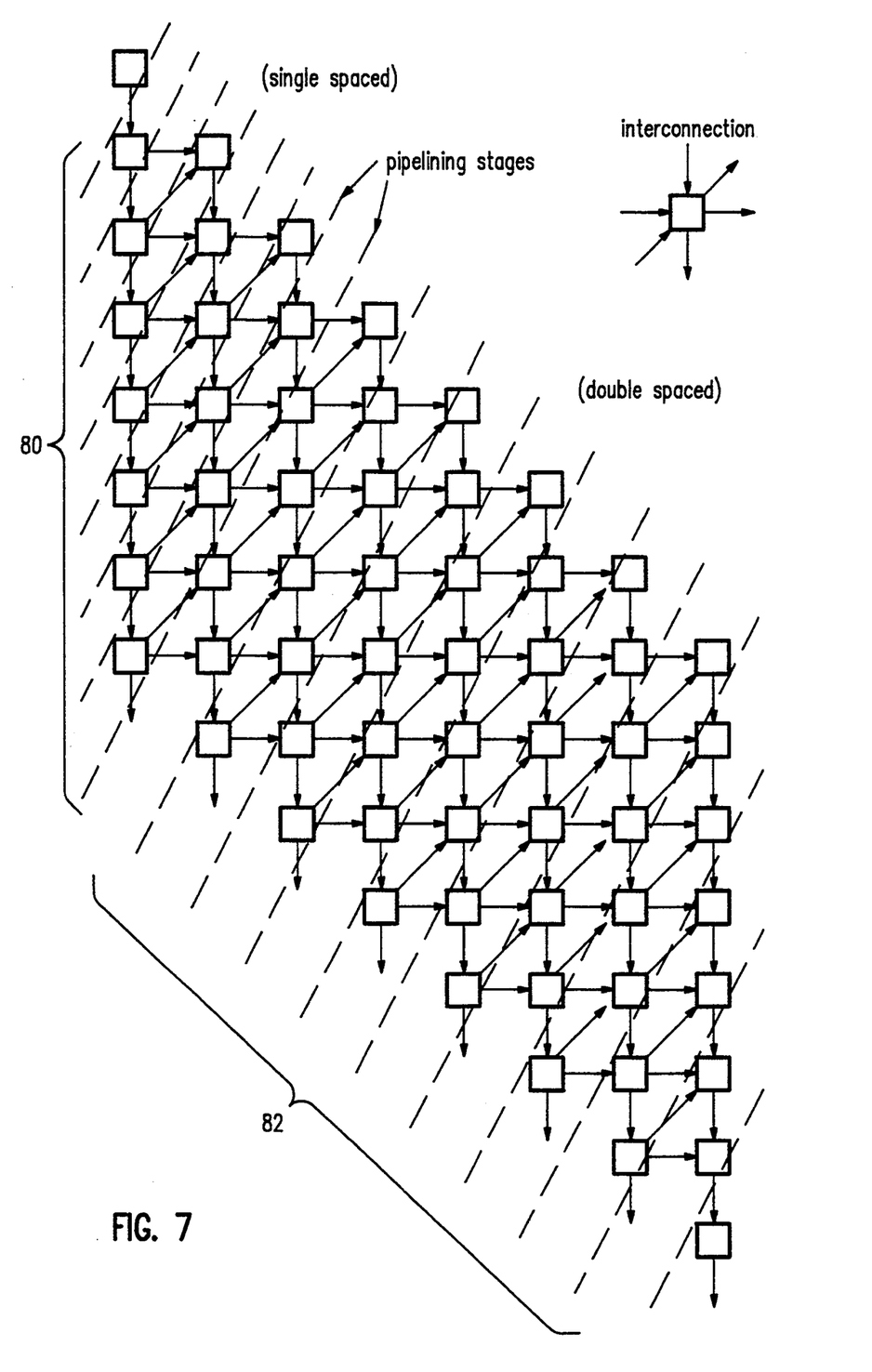
FIG. 7 is an 8-bit level pipeline divide circuit employing a plurality of the cells shown in FIG. 6, showing the location of the registers to accomplish pipeline.

Referring to FIG. 7 there is shown an 8-bit by 8-level divide circuit 20 employing a plurality of the basic cells 50. In the circuit shown in FIG. 7, a plurality of pipeline stages are shown by the plurality of dotted lines 80 and the plurality of dotted lines 82. The intersection of each of the dotted lines 80 and 82 with signal flow lines from each of the cells 50 shows the location where buffers need to be placed in order to pipeline the operation. For the dotted lines 80, buffers are placed at every signal input and output to and from each of the cells 50. Since the cell 50 is small and can operate very quickly (on the order of 1.7 ns), it is not necessary to buffer or place a register at the signal input and output of every signal path to every cell 50. Thus, the plurality of lines 82 do not intersect each of the signal lines input to and output from every single cell 50. The placement of the buffers are more staggered than the placement of buffers in accordance with the location specified by the dotted lines 80. Buffers or registers are placed between corresponding bits in every adjacent stage. However, buffers are staggered between every other bit within a stage.

With the circuit 20 comprising a plurality of basic cells 50, the latency becomes 4W. Even when taking the increased complexity into account, due to the carry-save bit absolute value generation, the benefits of an array of carry-save bit adders is clear.

What is claimed is:

1. An apparatus for producing a quotient binary digital signal from a numerator binary digital signal representative of a numerator binary value (N) and a denominator binary digital signal representative of a denominator binary value (D), said quotient binary digital signal representative of a quotient binary value (N/D), said apparatus comprising:
   a plurality of substantially similar electrical circuit stages, each electrical circuit stage comprising:
   a) first circuit means for receiving said numerator signal and said denominator signal and for adding said denominator signal to said numerator signal to produce an added signal, said added signal having a plurality of bit signals including a sign bit signal, said added signal representative of said numerator binary value minus said denominator binary value;

b) second circuit means for receiving said added signal and for producing an absolute value signal therefrom, said absolute value signal representative of the absolute value of the number represented by said added signal;

c) third circuit means for receiving said denominator signal and for shifting said denominator signal by one bit to produce a shifted signal therefrom, said shifted signal representative of the value of the number supplied thereto divided by two;

d) fourth circuit means for receiving said sign bit signal and a quotient bit signal from a prior stage and forming an exclusive OR therefrom to produce a quotient bit signal of the current electrical circuit stage; and means for connecting said plurality of electrical circuit stages by supplying the absolute value signal from one electrical circuit stage as the numerator signal to an immediately adjacent electrical circuit stage; and by supplying the shifted signal from one electrical circuit stage as the denominator signal to an immediately adjacent electrical circuit stage.

2. The apparatus of claim 1 wherein said denominator binary digital signal is a complement representation of a denominator value (D).

3. The apparatus of claim 2, wherein said first circuit means is a carry ripple adder for adding said numerator binary digital signal to said denominator binary digital signal from the least significant bit to the most significant bit.

4. The apparatus of claim 3, wherein said carry ripple adder comprises a plurality of bit adders one operating on each bit of the numerator signal and denominator signal.

5. The apparatus of claim 4, wherein said second circuit means produces an absolute value signal from said added signal from the most significant bit to the least significant bit.

6. The apparatus of claim 5, wherein said second circuit means comprises a plurality of exclusive OR gate circuits, one operating on each bit of the added signal.

7. The apparatus of claim 2, wherein said adder is a carry save adder for adding said numerator binary digital signal to said denominator binary digital signal from the most significant bit to the least significant bit.

8. The apparatus of claim 7, wherein said adder comprises a plurality of carry save bit adders, one for each bit of the numerator signal and denominator signal.

9. The apparatus of claim 8, wherein said second circuit means is a maximization circuit for producing an absolute value signal from said added signal from the most significant bit to the least significant bit.

10. The apparatus of claim 9, wherein said maximization circuit comprises a plurality of maximization bit circuits, one operating on each bit of the added signal.

11. The apparatus of claim 10, wherein:

each carry save bit adder receives two bits of the absolute value signal from the corresponding bit position maximization bit circuit from an immediately adjacent electrical circuit stage, and one bit of the shifted signal from the same corresponding bit position, from the immediately adjacent electrical circuit stage, and generates an output bit signal and a carry bit signal.

12. The apparatus of claim 11, wherein:

each bit maximization circuit receives the output bit signal from the corresponding carry save adder, and the carry bit signal from the bit immediately adjacent in bit position to the output bit signal.

13. The apparatus of claim 1 wherein said connecting means is a feedback connecting means.

14. A division circuit comprising:

a plurality of substantially identical electrical circuit stages with each electrical circuit stage comprising:

a) a plurality of carry save bit adder means, each for receiving a first binary signal corresponding to a binary position of a first binary number (N), a second binary signal corresponding to the same binary position of a second binary number (D), and for adding said first binary signal to said second binary signal to generate a first intermediate binary signal and a carry binary signal;

b) a plurality of absolute value bit circuit means one corresponding to each carry save bit adder means for receiving the first intermediate binary signal therefrom and the carry binary signal from a carry save bit adder means immediately adjacent in binary position to the corresponding carry save adder means and for generating a second intermediate binary signal, representing the absolute value;

c) shifting circuit means for receiving the second binary signal and for shifting said second binary signal by one bit, corresponding to dividing said second binary number by two, to produce a third intermediate binary signal;

d) logical exclusive OR gate means for receiving the carry binary signal of the carry save adder bit means processing the first binary signal corresponding to the most significant bit of the first binary number (N) and for receiving a quotient bit signal generated from a previous electrical circuit stage and for generating a quotient bit signal of the current stage, which is the exclusive OR thereof; and means for supplying the second intermediate binary signal from one electrical circuit stage to the carry save bit adder means of another electrical circuit stage as the first binary signal thereof, and for supplying the third intermediate binary signal from one electrical circuit stage to the carry save bit adder means of another electrical circuit stage as the second binary signal thereof.

15. A circuit for producing a quotient binary digital signal from a numerator binary digital signal representative of a numerator binary value (N) and a denominator binary digital signal representative of a denominator binary value (D), said quotient binary digital signal representative of a quotient binary value (N/D), said apparatus comprising:

a) first circuit means for receiving said numerator signal and said denominator signal and for adding said denominator signal to said numerator signal to produce an added signal, said added signal having a plurality of bit signals including a sign bit signal, said added signal representative of said numerator binary value minus said denominator binary value;

b) second circuit means for receiving said added signal and for producing an absolute value signal therefrom, said absolute value signal representative of the absolute value of the number represented by said added signal;

c) third circuit means for receiving said denominator signal and for shifting said denominator signal by one bit to produce a shifted signal therefrom, said shifted signal representative of the value of the number supplied thereto divided by two;

d) fourth circuit means for receiving said sign bit signal and a quotient bit signal from a prior stage and forming an exclusive OR therefrom to produce a quotient bit signal of the current stage; and feedback means for connecting the absolute value signal from the second circuit means to the first circuit means as the numerator signal thereof; and the shifted signal from the third circuit means to the first circuit means as the denominator signal thereof.

* * * * *